(12) United States Patent
Schlegel et al.

(10) Patent No.: US 8,724,746 B2
(45) Date of Patent: May 13, 2014

(54) SYSTEM AND METHOD FOR SIGNALING AND DETECTING IN WIRELESS COMMUNICATIONS SYSTEMS

(75) Inventors: Christian Schlegel, Park City, UT (US); Carmela Cozzo, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 428 days.

(21) Appl. No.: 13/050,437

(22) Filed: Mar. 17, 2011

(65) Prior Publication Data

US 2012/0236970 A1    Sep. 20, 2012

(51) Int. Cl.
*H04L 27/06*    (2006.01)

(52) U.S. Cl.
USPC .......................................... 375/340; 375/229

(58) Field of Classification Search
USPC .......... 375/229, 230, 232, 267, 347, 340, 350
See application file for complete search history.

(56) References Cited

U.S. PATENT DOCUMENTS

| | | | |
|---|---|---|---|
| 6,819,630 B1* | 11/2004 | Blackmon et al. | 367/134 |
| 7,724,832 B2 | 5/2010 | Hosur et al. | |
| 2003/0161258 A1 | 8/2003 | Zhang et al. | |
| 2006/0285531 A1* | 12/2006 | Howard et al. | 370/343 |
| 2010/0020854 A1* | 1/2010 | He et al. | 375/148 |
| 2010/0189199 A1* | 7/2010 | Lou et al. | 375/341 |
| 2012/0147942 A1* | 6/2012 | Schlegel et al. | 375/229 |
| 2012/0219051 A1* | 8/2012 | Yin et al. | 375/229 |

OTHER PUBLICATIONS

Lukasz Krzymien, Christian Schlegel and Shuai Zhang, "Improving uplink LTE performance with modulation-aware iterative equalization", University of Alberta, Canada, IEEE, Jun. 2010.*
Christian Schlegel and Zhenning Shi, "Optimal power allocation and code selection in iterative detection of random CDMA", University of Alberta, Canada, IEEE, Feb. 2004.*
Dmitri Truhachev, Christian Schlegel and Lukasz Krzymien, "A two-stage capacity-achieving demodulation/decoding method for Random Matrix Channels", University of Alberta, IEEE, Jan. 2009.*
Eric Bouton, Shuai Zhang, Lukasz Krzymien and Christian Schlegel, "Performance of Modulation-Aware Iterative Equalization in Uplink LTE Systems", University of Alberta, Canada, IEEE, 2010.*
International Search Report of Patent Cooperation Treaty, International Application No. PCT/CN2011/078687, Applicant Huawei Technologies Co., Ltd., et al., date of mailing Dec. 29, 2011, 3 pages.

* cited by examiner

*Primary Examiner* — Aristocratis Fotakis
(74) *Attorney, Agent, or Firm* — Slater & Matsil, L.L.P.

(57) ABSTRACT

A system and method for signaling and detecting in wireless communications systems are provided. A method for processing information includes operating in a first phase, operating in a second phase, and processing the detected information. The first phase includes iteratively inverting a first filtering operation on received signals, and the second phase includes iteratively inverting a second filtering operation on received signals with consideration given to a first estimation error of symbols of the first user and a second estimation error of symbols of the second user.

15 Claims, 8 Drawing Sheets

SYSTEM AND METHOD FOR SIGNALING AND DETECTING IN WIRELESS COMMUNICATIONS SYSTEMS

TECHNICAL FIELD

The present invention relates generally to a system and method for wireless communications, and more particularly to a system and method for signaling and detecting in wireless communications systems.

BACKGROUND

Generally, in a wireless communications system, such as a cellular communications system, cell edge users (also known as users, mobiles, mobile stations, subscribers, etc., operating at or near an edge of a coverage area of a base station, also commonly referred to as a NodeB, enhanced NodeB, base terminal station, communications controller, cell, and so forth) may need to carefully control the transmit power level of their transmissions in order to limit interference in cells of close-by neighboring base stations. The transmit power level of the cell edge users may be set by the base station and/or the cell edge users themselves.

The control of the transmit power level may result in lower received signal powers at the base station than would otherwise be possible. As a consequence, the interference level for a sector/frequency band serving a cell edge user may need to be carefully kept low in order to assure adequate data rates.

SUMMARY OF THE INVENTION

These and other problems are generally solved or circumvented, and technical advantages are generally achieved, by example embodiments of the present invention which provide a system and method for signaling and detecting in wireless communications systems.

In accordance with a preferred embodiment of the present invention, a method for processing information is provided. The method includes operating in a first phase. The first phase includes iteratively inverting a first filtering operation on received signals. The method also includes operating in a second phase. The second phase includes iteratively inverting a second filtering operation on received signals with consideration given to a first estimation error of symbols of a first user and a second estimation error of symbols of a second user. The method further includes processing the detected information.

In accordance with another preferred embodiment of the present invention, a method for processing received information is provided. The method includes receiving a signal, performing basic mode detection on the signal, thereby producing a partially detected signal, performing composite mode detection on the partially detected signal, thereby producing a detected signal, and decoding the detected signal.

In accordance with another preferred embodiment of the present invention, a receiver is provided. The receiver includes an iterative demodulator and a further processing unit coupled to the iterative demodulator. The iterative demodulator is coupled to a plurality of signal inputs and detects information in received signals based on soft estimates of the information, and the further processing unit provides further processing of soft estimates of the information based on transmit power levels of the information.

In accordance with another preferred embodiment of the present invention, a communications device is provided. The communications device includes a transmitter, and a receiver coupled to the transmitter. The transmitter transmits signals, and the receiver receives signals and detects information in the received signals based on soft symbol estimates of the transmitted information.

One advantage disclosed herein is that careful sector/frequency band planning for cell edge users may not be as crucial in providing adequate performance, which may allow for better frequency band utilization and simplify communications system planning.

A further advantage of exemplary embodiments is that different power levels of received signals at the receiver (due to path loss and/or careful transmit power level planning) may be used to separate different mobile signals via simple iterative cancellation or filter-enhanced iterative cancellation to allow for higher overall communications rates.

The foregoing has outlined rather broadly the features and technical advantages of the present invention in order that the detailed description of the embodiments that follows may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a 3GPP LTE compliant communications system. The invention may also be applied, however, to other communications systems, such as those that are compliant to the technical standards of 3GPP LTE-Advanced, WiMAX, and so forth.

Figure 1:
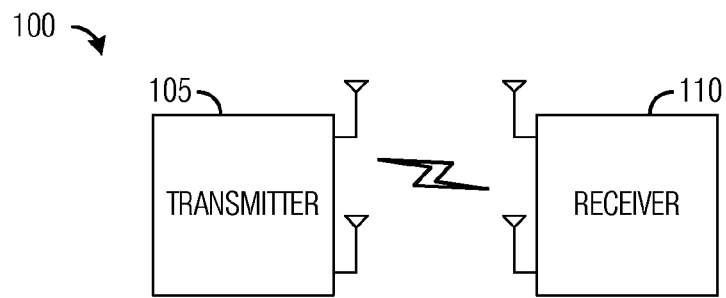
FIG. 1 illustrates an example diagram of a communications system.

FIG. 1 illustrates a communications system 100. As shown in FIG. 1a, communications system 100 includes a transmitter 105 and a receiver 110. As shown in FIG. 1, both transmitter 105 and receiver 110 may include multiple antennas (multiple transmit and/or receive antennas) and therefore may be capable of operating in a multiple-input, multiple-output (MIMO) mode. Transmitter 105 may be a part of a first communications device, such as an eNB, and receiver 110 may be a part of a second communications device, such as a UE. The first communications device and the second communications device may include other circuitry, such as other receivers and transmitters, as well as analog signal processing circuitry, digital signal processing circuitry, data processing circuitry, and so forth.

Although not shown, electronic devices may be coupled to transmitter 105 and/or receiver 110. Examples of electronic devices may include a computer, personal digital assistant, media server, media player, or so forth, may be coupled to transmitter 105 and/or receiver 110 to be able to communicate with other electronic devices. Alternatively, transmitter 105 and/or receiver 110 may be integrated into electronic devices. Generally, an electronic device will include both a transmitter and a receiver to enable two-way communications.

Receiver 110 may include multiple signal chains, one for each receive antenna. Although receiver 110 may include multiple signal chains, not all of them may be active at once. In general, a number of signal chains active in receiver 110 may depend on an operating mode of receiver 110. Therefore, the discussion of a specific number of signal chains should not be construed as being limiting to either the scope or spirit of the embodiments. Furthermore, in the interest of clarity, only components of receiver 110 relevant to the embodiments will be discussed herein. It should be understood that receiver 110 includes a number of components that may be required for operation but are not discussed. These components may include memories, amplifiers, filters, analog-to-digital converters, digital-to-analog converters, and so forth.

In general, receiver 110 may take signals received at its receive antennas and decode the received signals to produce information that may be used by applications to control the operation of receiver 110 or device coupled to receiver 110, stored for subsequent use, provided to a user of the device coupled to receiver 110 (e.g., music, videos, photos, text, data, applications, etc.), transmitting to another device, or so forth. The accuracy of the information produced by receiver 110 as compared to information contained in the signals as transmitted by transmitter 105 may be a function of the quality of the channel, the strength of a code (if any) used to encode the information transmitted by transmitter 105, and so forth.

Figure 2:
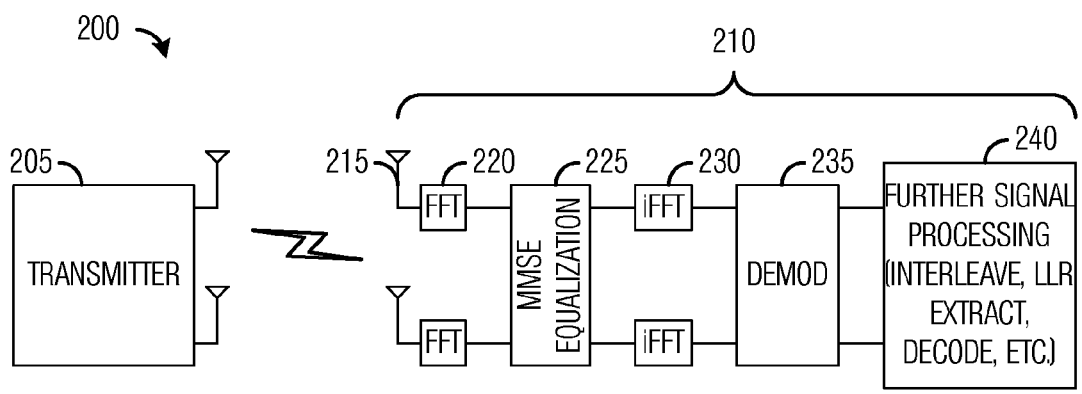
FIG. 2 illustrates an example communications system, wherein a detailed view of a receiver is provided according to example embodiments described herein.

FIG. 2 illustrates a communications system 200, wherein a detailed view of a receiver is provided. Communications system 200 includes a transmitter 205 transmitting to a receiver 210. Receiver 210 may be indicative of a receiver of a communications device in a 3GPP LTE compliant communications system. Receiver 210 may be operating in a MIMO operating mode. Receiver 210 may include two or more receive antennas, with each antenna feeding a separate signal path. The discussion provided focuses on a single signal path with other signal paths of receiver 210 being substantially similar. Any significant differences will be noted.

A discrete Fourier transform unit 220 may convert a time-domain signal received by antenna 215 into a frequency-domain signal using a Fast Fourier Transform (FFT), for example. The frequency-domain signal may be equalized with equalization unit 225, which may implement minimum mean-squared equalization (MMSE), for example. Equalization unit 225 may equalize frequency-domain signals from each of the antennas (signal paths). The equalized signals may be converted back into time-domain signals by an inverse Fourier transform unit 230 using an inverse Fast Fourier Transform (iFFT), for example, or directly processed if the data is already encoded in the frequency domain. The former occurs on the LTE uplink, and the latter on the LTE downlink channels.

Time-domain versions of the equalized signals may be provided to a demodulator 235 that may be used to provide Quadrature Phase Shift Keying (QPSK)/Quadrature Amplitude Modulation (QAM) demodulation. A further processing unit 240 may provide processing, such as interleaving, log likelihood ratio (LLR) extraction, turbo decoding, and so forth, to the demodulated signal. After further processing, data extracted from the received signal may be provided to circuitry attached to receiver 210, where it may be further processed, stored, displayed, or so on.

A factor in the quality of the signal received at a receiver may be the signal received power. Since a distance between transmitter and receiver impacts a received signal power level, wherein typically the greater the distance between transmitter and receiver the lower the received signal power level. A commonly used technique in multi-user communications systems is to use transmit power control to set a transmitter power control so that all received signals are at substantially the same power level, independent of distance between the receiver and the various transmitters. Therefore, a receiver that is far away from the receiver will need to transmit at a higher power level than a receiver that is close to the receiver. For example, a cell edge user may have it's transmit power adjusted so that it does not become an overwhelming interferer to users that are operating in neighboring cells. However, such high-power transmitters may become significant sources of interference to other, unintended receivers.

In 3GPP LTE compliant communications systems, uplink (UL) signaling uses a time-domain signal that is transformed into a frequency-domain signal for transmission. Let $v_1$ be a sequence of time-domain symbols (per block) of user #1. In order to modulate the signal on orthogonal frequency-division multiplexing (OFDM) carriers of 3GPP LTE compliant communications systems, a discrete Fourier transform (DFT) may be applied. The resulting signal may be expressed as $$x^{(f)} = ZF_M v,  \qquad (1)$$

where Z is a frequency selection matrix. In a situation where there are transmissions from multiple users, the signal at the receiver may be expressed as $$x^{(f)} = \sum_{k=1}^{K} \sqrt{P_k}\, Z_k F_M v_k + \sigma n, \qquad (2)$$

where $Z_k$ is a frequency selection matrix for user (or stream) k, and $P_k$ is its received power.

The signal at the receiver may be transformed back into a time-domain signal by an inverse DFT (iDFT), which may be expressed as $$x = \sqrt{P_1}\, v_1 + \sum_{k \neq 1}^{K} F_M^H Z_k^{(-1)} Z_1 F_M \sqrt{P_k}\, v_k + \sigma n;\ n \sim \{N(0,1)\}^M, \qquad (3)$$

where kernel matrix $Z_k^{(-1)} Z_1$ selects only those OFDM channels which are shared by users #1 and #k. The middle term in Equation (3)

$$\left( \sum_{k \neq 1}^{K} F_M^H Z_k^{(-1)} Z_1 F_M \sqrt{P_k}\, v_k \right)$$

is the joint user interference as seen by user #1. A conventional receiver would treat the joint user interference as noise with variance $\sigma^2 + \Sigma_{k \neq 1}^{K} \alpha_k P_k$, where $\alpha_k$ is the fraction of OFDM frequencies users #1 and #k share.

It may be possible to express the time-domain signal differently. Let $y^{(f)}$ be a union of all frequency bins utilized by the K users/streams. Then $y^{(f)}$ may be expressed as $$y^{(f)} = \begin{bmatrix} \sqrt{P_1}\, Z_1 F_M, & \ldots, & \sqrt{P_K}\, Z_K F_M \end{bmatrix} \begin{bmatrix} v_1 \\ \vdots \\ v_K \end{bmatrix} + \begin{bmatrix} n_1 \\ \vdots \\ n_K \end{bmatrix}$$

$$= H F_M \begin{bmatrix} v_1 \\ \vdots \\ v_K \end{bmatrix} + \begin{bmatrix} n_1 \\ \vdots \\ n_K \end{bmatrix},$$

where H is the frequency-domain channel from all K users to the receiver. If multiple antennas are used at the receiver, then the dimensions of H and $y^{(f)}$ are changed accordingly.

In advanced 3GPP LTE processing, a minimum mean-squared error (MMSE) receiver would suppress the mutual interference and extract individual data streams using $$\begin{bmatrix} \hat{v}_1 \\ \vdots \\ \hat{v}_K \end{bmatrix} = F_M^H H^H (HH^H + \sigma^2 I)^{-1} y^{(f)}. \qquad (4)$$

In certain situations, it may be preferable to reverse the order of matched filtering with that of inversion. Using the matrix inversion lemma, it is possible to reexpress Equation (4) as $$\begin{bmatrix} \hat{v}_1 \\ \vdots \\ \hat{v}_K \end{bmatrix} = F_M^H (H^H H + \sigma^2 I)^{-1} H^H y^{(f)}. \qquad (5)$$

In general, Equation (5) may be more efficient if the row rank of H is smaller than its column rank. Processing may be particularly simple if K=1, and only single-antenna terminals are used, which case the matrix to be inverted is purely diagonal.

However, this is not the case when K≠1, and inversion complexity increases. Furthermore, Equation (4) is efficient only when K<$N_r$, where $N_r$ is the number of receive antennas of the receiver, since the dimensions of the matrix to be inverted in Equation (4) are K×K. However, when K≥$N_r$, Equation (5) may be preferable, since it has dimension $N_r$×$N_r$.

Under circumstances like those discussed herein, it may be beneficial to translate processing into the time-domain. Translation may be done by introducing Fourier Transform kernels as follows (note that $F_M$ is simplified to F to de-clutter notation).

$$\begin{bmatrix} \hat{v}_1 \\ \vdots \\ \hat{v}_K \end{bmatrix} = F^H (H^H H + \sigma^2 I)^{-1} F F^H H^H y^{(f)} \qquad (6)$$

$$= (F^H H^H H F + \sigma^2 I)^{-1} F^H H^H y^{(f)}$$

$$= (\tilde{H} + \sigma^2 I)^{-1} F^H H^H y^{(f)},$$

where matched filtering is performed in the frequency domain and $\tilde{H}$ is a time domain correlation matrix with Toeplitz form.

It may be possible to replace a linear inversion filter with an iterative implementation which utilizes symbol estimates in the recursion as presented below. In this manner, efficient signal cancellation may be performed even in cases with strong interference. Soft estimated symbols can be fed back into an iterative cancelation loop, which is very short in the case of a soft-symbol demodulation only feedback path. Good results may be achieved with a conjugate gradient (CG) iterative approximation to the matrix inversion shown in Equation (4). Significant reductions in computational complexity may be realized over frequency domain matrix inversion, particularly for larger numbers of users and antennas.

Figure 3A:
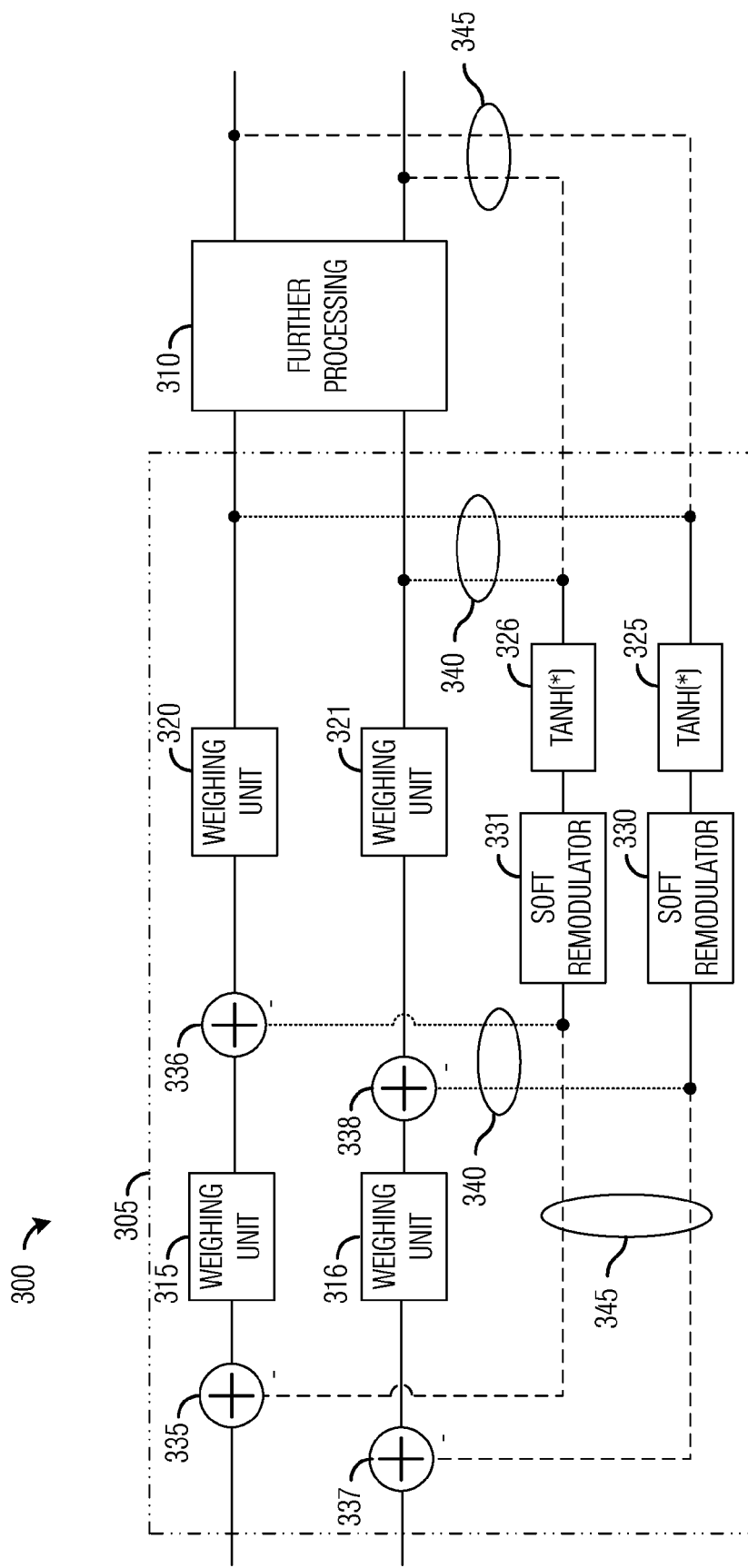
FIG. 3a illustrates an example detailed view of a portion of a first receiver according to example embodiments described herein.

FIG. 3a illustrates a detailed view of a portion of a receiver 300. As shown in FIG. 3a, a demodulation unit 305 and a further processing unit 310 are illustrated in detail. Demodulation unit 305 may be an implementation of an iterative approach to demodulating the signals received by a receiver. Demodulation unit 305 may be an implementation of demodulation unit 235 of receiver 210 of FIG. 2. Further processing unit 310 may be an implementation of further signal processing unit 240 of receiver 210 of FIG. 2. Typically, further processing occurring in further processing unit 310 consists of error control decoding, for example, in a 3GPP LTE compliant communications system, a turbo code decoder is used which may produce log-likelihood estimates of the transmitted binary symbols.

For discussion purposes, let receiver 300 be a two-antenna receiver, and therefore has two signal paths. When used in a receiver with a different number of receive antennas, there may necessarily be a different number of signal paths.

Although the discussion focuses on a receiver with two receive antennas, the embodiments discussed herein may be operable with other numbers of receive antennas, such as three, four, and so forth. Therefore, the discussion of a receiver with two receive antennas should not be construed as being limiting to either the scope or the spirit of the embodiments.

A first signal path (for signals from a first receive antenna) includes a first weighing unit 315 may be used to apply a weighting factor to the first received signal. According to an embodiment, first weighing unit 315 may apply a weighting factor that is based on a user whose signal is being detected and may be dependent on factors such as a received power level of the user's signals. To arrive at the weighting factor(s), additional computational steps may be required, for example, in the computing update factors in a conjugate gradient method. A second weighing unit 320 may be used to apply a weighing factor and/or insert a delay into the first signal path in order to properly align signals for further processing. According to an embodiment, second weighing unit 320 may also include as a bit log-likelihood ratio extractor, in which case an output of weighing unit 320 may be log-likelihood ratios of binary digits embedded in the first received signal.

In general, a weighing unit may also be used to insert delays into a signal. As an example, weighing units in the first signal path and in a second signal path may be used to insert delays into signals in the first signal path and the second signal path to align the signals.

The first signal path also includes a soft bit generator 325. Soft bit generator 325 may compute soft bits from the delayed and weighed signal received from the first signal path. According to an embodiment, soft bit generator 325 may be implemented using a hyperbolic tangent (tan h(.)) function. However, other non-linear functions, adapted to specific signal constellations, may be used to generate soft bits and therefore, the discussion of the use of tan h(.) to generate soft bits should not be construed as being limiting to either the scope or spirit of the embodiments. A soft-symbol remodulator 330 may be used to remodulate the soft bits generated by soft bit generator 325. According to an embodiment, a soft estimate of the first signal may be reconstructed using soft bit generator 325 and soft-symbol remodulator 330.

Also in the first signal path is a first summing point 335 that subtracts remodulated soft bits from a second signal path (e.g., a soft estimate of the second signal) from the weighted first signals. Similarly, a second summing point 336 also subtracts remodulated soft bits from a second signal path (e.g., a soft estimate of the second signal) from the weighted first signals. The cross coupling of the two signal paths allows for a cancellation of signals from different users/streams.

Also, depending on the specific implementation of the equalizer (for example, equalizer 225), interference of the first signal stream to itself may also be present, in which case soft remodulation symbols are also fed back to the first signal path for cancellation in first summing point 335 or second summing point 336. The particular embodiment discussed in FIGS. 3a and 3b assumes that such interference does not exist, or has been appropriately cancelled by equalizer 225. Focus on this special structure shall not be construed as exclusive, and more general interference cancellation including self interference shall be considered a natural application of the concepts herein.

A second signal path similarly includes a third weighing unit 316, a fourth weighing unit 321, a soft bit generator 326, a soft-symbol remodulator 331, a third summing point 337, and a fourth summing point 338. Like in the first signal path, third summing point 337 (and fourth summing point 338) subtracts remodulated soft bits from the first signal path (e.g., a soft estimate of the first signal) from the weighed second signals. According to an embodiment, circuitry in the second signal path may be configured in a manner similar to circuitry in the first signal path.

The feedback paths of the first signal path and the second signal path may change (in terms of where the signal feedback is initiated) depending on a state of receiver 300. According to an embodiment, receiver 300 may be in one of two states depending on the demodulation progress of the received signals. In a first state of receiver 300, receiver 300 may be adjusting (computing) the weighting factor to be used by first weighing unit 315 and second weighing unit 320, as well as the soft remodulation functions used by soft remodulator 330 to remodulate the soft bits generated by soft bit generator 325. While in the first state, the feedback paths of the first signal path and the second signal path are connected to outputs of second weighing unit 320 and fourth weighing unit 321 (shown in FIG. 3a as highlights 340) and to second summing point 336 and fourth summing point 338.

Receiver 300 may be in the first state in an initial or early stage of signal detection. In the first state, the iterative processing may be understood as an application of iterative matrix solution method, such as the first-order iterative method, the Chebycheff method, or the conjugate gradient method, all discussed in the relevant literature on iterative matrix solution methods. Additionally, the feedback circuitry in the feedback paths contains soft bit estimators 325 and 326, and therefore constitutes a discrete-symbol extension of these methods. Receiver 300 may be considered to be inverting matrices while operating in the first state.

According to an embodiment, receiver 300 may remain in the first state for a specified number of iterations or until the weighting factor and/or soft remodulation functions have converged.

In a second state of receiver 300, where receiver 300 may be receiving signals from users at widely differing power levels, additional processing of the received signals may be provided (by further processing unit 310), typically an error control decoder, prior to being fed back. While in the second state, the feedback paths of the first signal path and the second signal path are connected to outputs of further processing unit 310 (shown in FIG. 3a as highlight 345) and to first summing point 335 and third summing point 337. Receiver 300 may be in the second state after the initial or early state of signal detection completes. Receiver 300 may be considered to be cancelling user interference while operating in the second state.

Figure 3B:
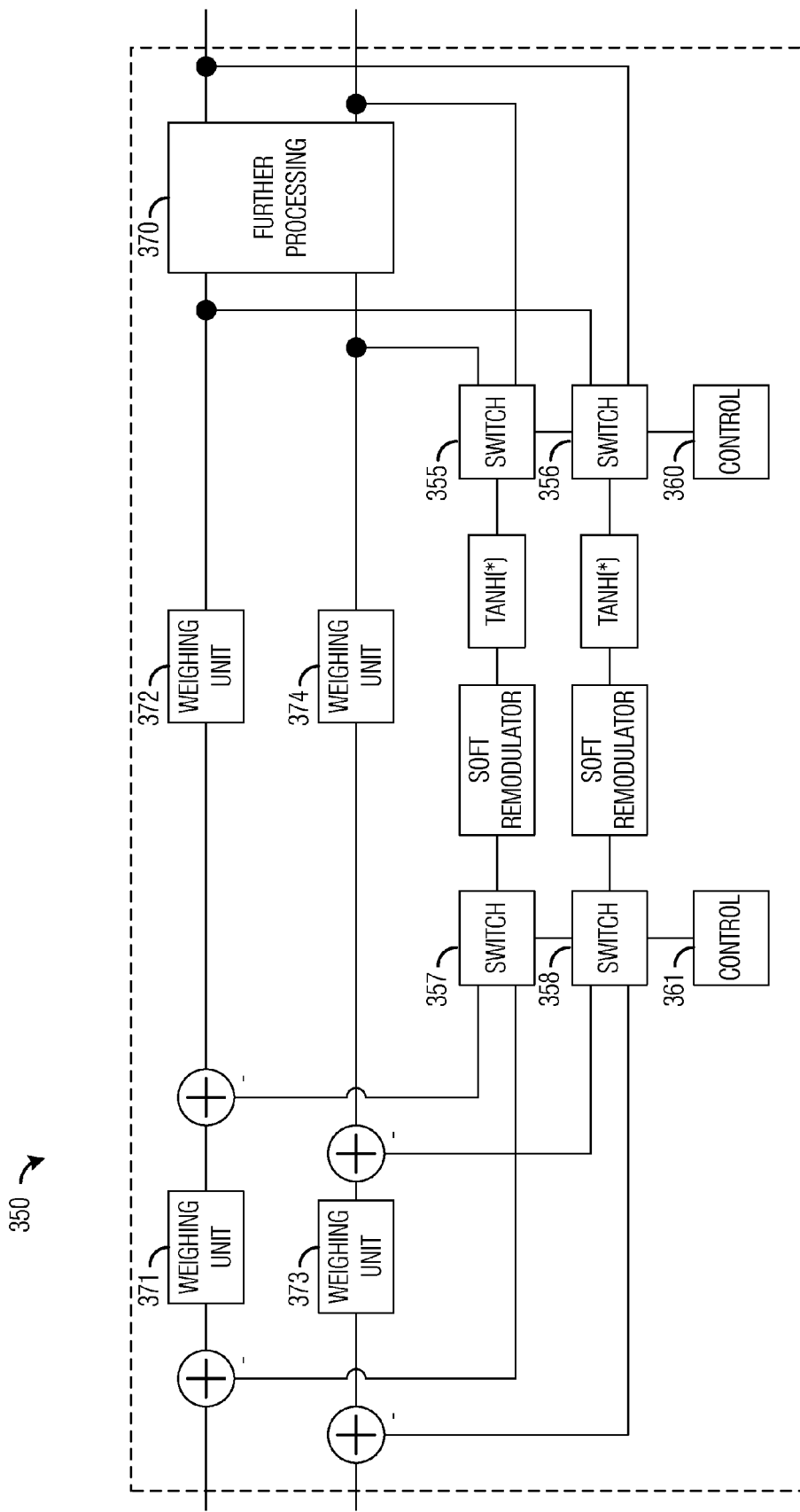
FIG. 3b illustrates an example detailed view of a portion of a second receiver according to example embodiments described herein.

FIG. 3b illustrates a detailed view of a portion of a receiver 350. As shown in FIG. 3b, pairs of switches (a first pair of switches 355 and 356 and a second pair of switches 357 and 358) may be used to allow a change in where a feedback signal for a first signal path and a second signal path is taken, as well as where feedback signals from the first signal path and the second signal path are combined back into the first signal path and the second signal path. The pairs of switches may be controlled by control signals that selects one of two inputs (with a first input being an output of a weighing unit and a second input being an output of a further processing unit) and one of two outputs (with a first output being prior to both weighing units and a second output being between both weighing units). Multiplexers may be used to implement the switches in the pairs of switches. The control signal may be produced by a control unit 360 and a control unit 361.

As an example, initially control unit 360 may generate a control signal that will result in the pair of switches 355 and 356 selecting the output of weighing units 372 and 374 to be output and then after a specified number of iterations have taken place or when a weighting factor and/or soft demodulation functions have converged, control unit 360 may generate a control signal that will result in the pair of switches 355 and 356 selecting the output of further processing unit 370 to be output. Similarly, initially control unit 361 may generate a control signal that will result in the pair of switches selecting the first output of respective pair of switches 357 and 358 coupled to control unit 361 to couple the feedback signals back to inputs of weighing units 372 and 374, then after a specified number of iterations have taken place or when a weighting factor and/or soft demodulation functions have converged, control unit 361 may generate a control signal that will result in the pair of switches 357 and 358 selecting the second output of respective switches coupled to control unit 361 to couple the feedback signals back to inputs of weighing units 371 and 373.

Although the discussion of FIG. 3b focuses on a single control unit, such as control unit 360 and control unit 361, to generate control signals for the pairs of switches 355 and 356 and 357 and 358, each of the switches may be controlled by control signals generated by separate control units. As an example, switch 355 may be controlled by a control signal generated by a first control unit, switch 356 may be controlled by a control signal generated by a second control unit, switch 357 may be controlled by a control signal generated by a third control unit, and switch 358 may be controlled by a control signal generated by a fourth control unit. Therefore, the illustration and discussion of a pair of switches controlled by a control signal generated by a single control unit should not be construed as being limiting to either the scope or the spirit of the embodiments.

Figure 3C:
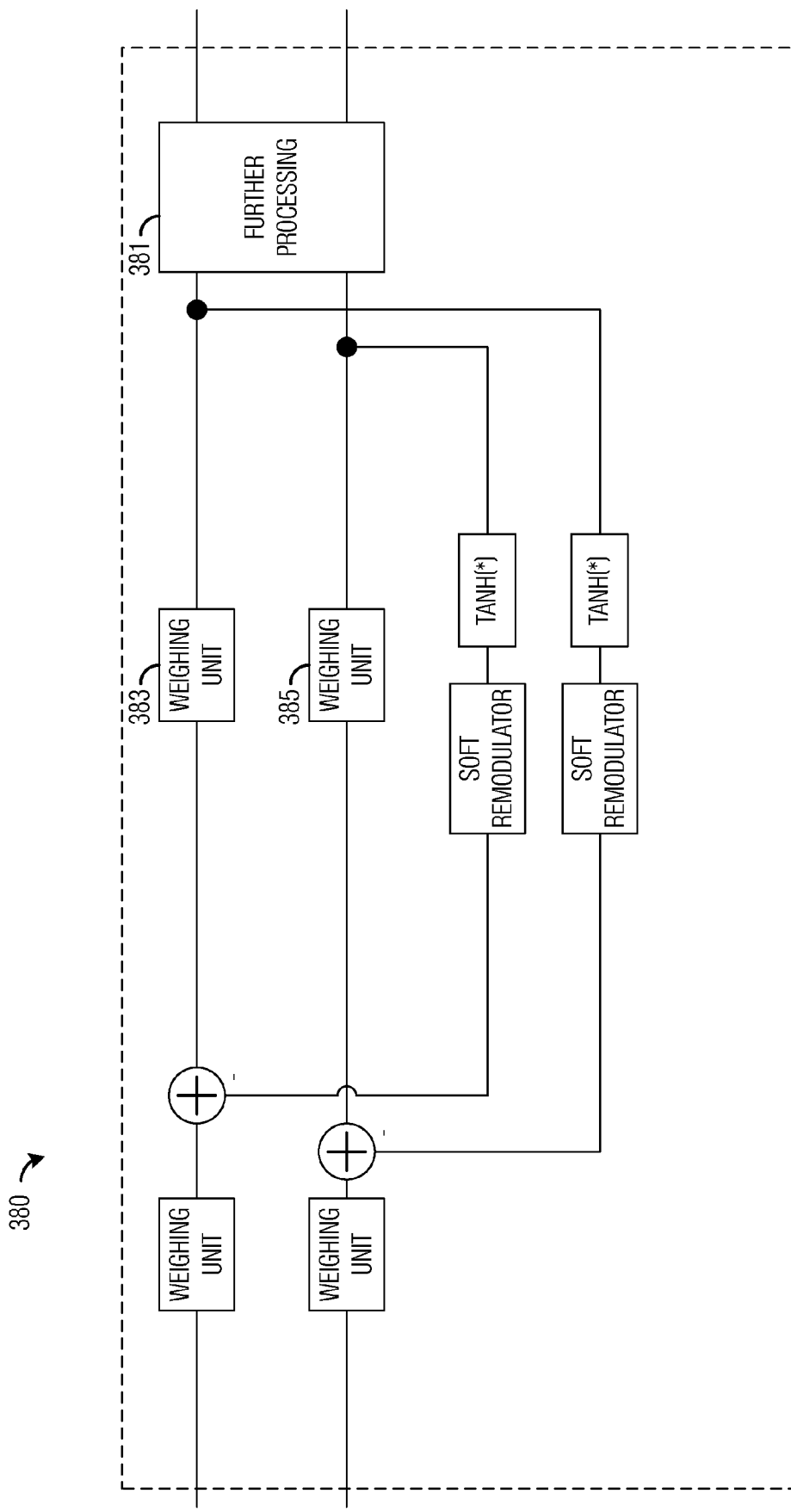
FIG. 3c illustrates an example detailed view of a portion of a receiver, wherein receiver is operating in a first state according to example embodiments described herein.

FIG. 3c illustrates a detailed view of a portion of a receiver 380, wherein receiver 380 is operating in a first state. When receiver 380 is operating in the first state, switches in receiver 380 that may be used to reconfigure signal paths of receiver 380 may be set so that signal feedback occurs prior to a further processing unit 381 and is combined at points at inputs of weighing units 383 and 385.

Figure 3D:
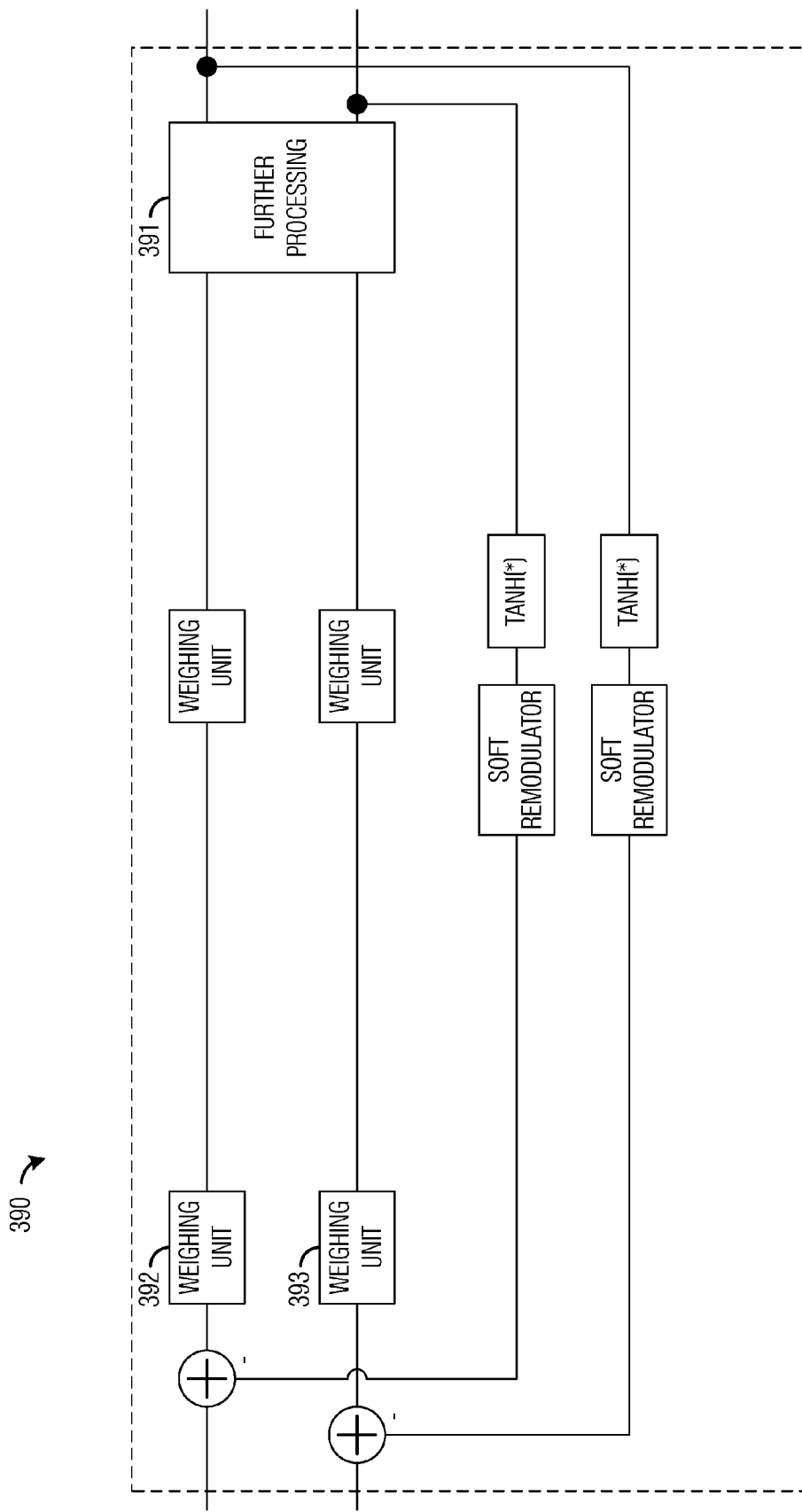
FIG. 3d illustrates an example detailed view of a portion of receiver, wherein receiver is operating in a second state according to example embodiments described herein.

FIG. 3d illustrates a detailed view of a portion of receiver 390, wherein receiver 390 is operating in a second state. When receiver 390 is operating in the first state, switches in receiver 390 that may be used to reconfigure signal paths of receiver 390 may be set so that signal feedback occurs after an output of a further processing unit 391 and is combined at points at inputs to weighing units 392 and 393.

Figures 4A, 4B:
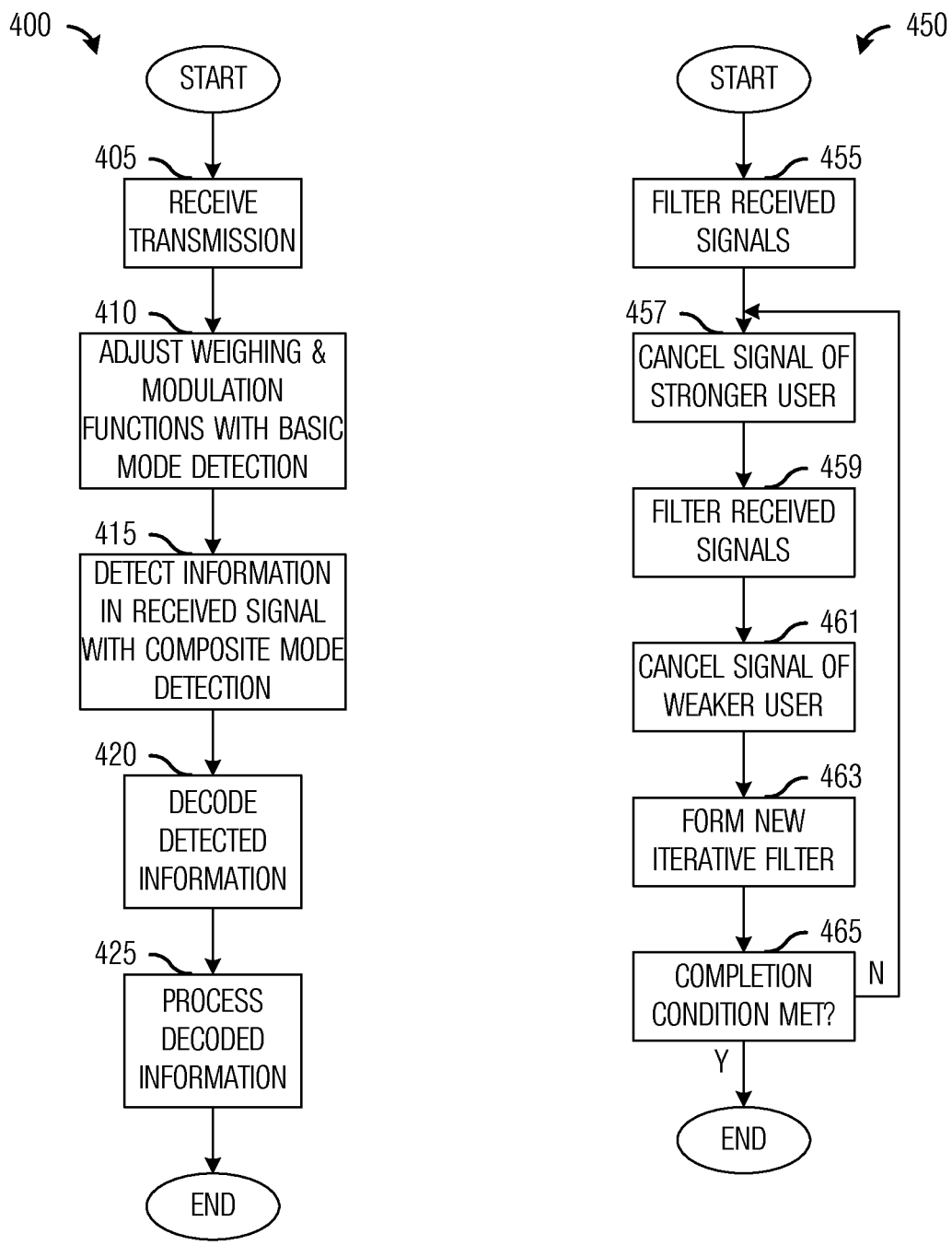
FIG. 4a illustrates an example flow diagram of receiver operations in receiving and decoding information in a received signal, wherein multi-mode detection of the received signal is used according to example embodiments described herein.
FIG. 4b illustrates an example flow diagram of high-level receiver operations in decoding operations in a received signal using composite mode detection according to example embodiments described herein.

FIG. 4a illustrates a flow diagram of receiver operations 400 in receiving and decoding information in a received signal, wherein multi-mode detection of the received signal is used. Receiver operations 400 may be indicative of operations occurring in a receiver, such as receiver 210 and receiver 300, as the receiver receives information transmitted by a transmitter over two or more antennas. The receiver makes use of iterative techniques for detecting and decoding information from the received signals. Receiver operations 400 may occur while the receiver is in a normal operating mode.

In a basic mode, iterations are executed with a receiver, such as receiver 300, utilizing a feedback loop that follows an inner loop, such as loop 340 shown in FIG. 3a. Basic mode has low latency and reduced processing complexity. Its use may be appropriate and sufficient in a variety of channel signal conditions to be determined by the receiver control. In general, the basic mode is expected to be effective in situations of approximately equal power of the different users, in high-rate and low interference situations. A composite mode, in which the receiver utilizes a feedback loop that includes further processing, such as loops 345 shown in FIG. 3a, resembles a full cancellation system and may be more effective in situations of large received power disparities and/or low-rate situations of one or both data streams. In such situations the added inclusion of processing unit 310 entails substantial performance advantages. For an example see FIG. 5.

Although the discussion presented herein focuses on uplink channels, the embodiments may be operable with downlink channels as well. Therefore, the discussion of uplink channels should not be construed as being limiting to either the scope or the spirit of the embodiments.

Receiver operations 400 may begin with the receiver receiving transmissions from one or more transmitters over its two or more receive antennas (block 405). Since the receiver is just beginning to receive the transmissions, the receiver may begin with operating in a first state, wherein a weighting factor and/or soft remodulation functions may be adjusted for each signal path in the receiver (block 410). According to an embodiment, the weighting factor and the soft remodulation functions may be adjusted in order to implement an iterative inversion of matrix $$(\tilde{H}+\sigma^2 I)^{-1}, \quad (7)$$

which is an iterative implementation of an MMSE filter. The iterative inversion may proceed in a time-domain implementation as discussed in FIGS. 3a and 3b, or may alternately be moved to the frequency domain by applying FFT operations into each cancellation path and moving the cancellation to a position before iFFT block 230 in FIG. 2.

A preferred implementation of Equation (7) may use a CG method as the CG method may provide the fastest convergence. Furthermore, a non-linear function (e.g., a hyperbolic tangent function) used to generate soft bits from bit reliability values (e.g., LLR) may be applied to some or all of the iterations. Additionally, other types of filters may be used instead of the MMSE filter in Equation (7), such as zero forcing filters, and so on. Due to the Toeplitz structure of $\tilde{H}$, the iterative inversion of Equation (7) may require only LM multiplications per iteration step, where L is a number of distinct paths or non-negligible elements in $\tilde{H}$.

The detection of information in the first state may be referred to as basic mode detection. Referencing FIG. 3b, the switches 355 and 356 may be configured so that outputs of weighing units 372 and 374 are fed back to the respective signal paths, and switches 357 and 358 may be configured so that the outputs of weighing units 373 and 374 are provided to weighing units 372 and 374.

Returning to FIG. 4a, once the weighting factors and/or the soft remodulation function(s) have been adjusted, either after a specified number of iterations has taken place or when the weighting factors and/or the soft remodulation function(s) have converged, the information in the received signals may be detected, wherein the receiver is operating in a second state (block 415). While in the second state, the receiver is using an iterative implementation of a matrix inverter with locally optimal soft symbol estimates instead of linear signals.

According to an embodiment, when the receiver is operating in the second state, further processing is provided to the received signals prior to feeding back the received signal for cancellation purposes. When the receiver is operating in the second state, the receiver is said to be performing composite mode detection. Referencing FIG. 3b, switches 355 and 356 may be configured so that outputs of further processing unit 370 are fed back to the respective signal paths, and switches 357 and 358 may be configured so that the outputs of further processing unit 370 are provided to weighing units 371 and 373.

According to an embodiment, composite mode detection occurs when there is a user, a stream, a group of users, and/or a group of streams that is transmitting at a power level that is substantially greater than a transmit power level of other user, stream, users, and/or streams. Composite mode detection may involve basic mode detection as well as further processing to compensate for the user, stream, users, and/or streams that are transmitting at the substantially higher power level. Composite mode detection may continue until the information in the received signal is detected. A detailed description of composite mode detection is provided below. Although the discussion focuses on a situation wherein a user, stream, users, and/or streams transmit at a substantially higher power level than other user, stream, users, and/or streams, the embodiments may be applicable to other transmit power level situations, such as when the transmit power level of all users are approximately equal, when the users transmit in a wide array of power levels, and so forth. Therefore, the discussion should not be construed as being limiting to the scope or spirit of the embodiments.

Returning to FIG. 4a, after the information in the received signal has been detected, they may be decoded (block 420). After decoding, the information may be processed (block 425). For example, the information may be used to control the operation of the receiver, control the operation of the electronic device coupled to the receiver, stored for subsequent use, provided to a user of the electronic device coupled to receiver (e.g., music, videos, photos, text, data, applications, etc.), or so forth. Receiver operations 400 may then terminate.

According to an embodiment, composite mode detection may be applied to higher order modulation alphabets, wherein the higher order modulation may be viewed as a superposition of binary (or lower-order) data streams.

FIG. 4b illustrates a flow diagram of high-level receiver operations 450 in decoding operations in a received signal using composite mode detection. Receiver operations 450 may be indicative of operations occurring in a receiver, such as receiver 210, as the receiver receives information transmitted by a transmitter over two or more antennas. The receiver makes use of iterative techniques for detecting and decoding information from the received signals and when user, stream, users, and/or streams are transmitting at substantially higher power levels than other user, stream, users, and/or streams. Receiver operations 450 may occur while the receiver is in a normal operating mode.

Receiver operations 450 provide a high-level view of receiver operations in decoding a received signal using composite mode detection. A detailed view of exemplary receiver operations in decoding a received signal using composite mode detection is provided below.

As discussed previously, composite mode detection may preferably be applied in situations where there exists a user, stream, users, and/or streams that are transmitting at a substantially higher power level than other user, stream, users, and/or streams. However, composite mode detection may be applied in other situations, such as when there are multiple users and/or transmitting at different power levels that are still substantially higher than other user, stream, users, and/or streams, there are users and/or streams transmitting at a variety of different power levels, and so forth.

As its name implies, composite mode detection comprises multiple phases or states of operation. According to an example embodiment, composite mode detection as discussed herein utilizes two states of operation.

Without loss of generality, consider a situation with two users: user #1 transmitting at power level $P_1$ and user #2 transmitting at power level $P_2$, where $P_1 \gg P_2$. Although the discussion focuses on a two user system, the example embodiments discussed herein may be readily extended to any number of users by those of ordinary skill in the art of the present invention.

Composite mode detection may begin with filtering of received signals from user #1 and user #2 (block 455). According to an example embodiment, filtering of received signals from user #1 and user #2 may be performed in a receiver, such as receiver 300 of FIG. 3a, by iteratively processing the received signals through a signal path including feedback paths shown as path 340.

Further processing may be applied to the received signals from user #1, e.g., cancel signals using soft decoded bits and/or symbols (block 457). According to an example embodiment, further processing of the received signals from user #1 may be performed by iteratively processing the received signals through a signal path including feedback paths shown as path 345 in FIG. 3a.

The received signals, after further processing has been applied to the received signal from user #1 may be filtered again (block 459). Once again, filtering of the received signals may be performed by iteratively processing the received signals through the signal path including feedback paths shown as path 340.

In general, iterative processing of the received signal through the signal path including feedback paths shown as path 340 (heretofore referred to as an inner loop) may result in a filtering of the received signal, while iterative processing of the received signal through the signal path including feedback paths shown as path 345 (heretofore referred to as an outer loop) may result in a cancelling of the received signal.

Further processing may be applied to the received signals from user #2, e.g., cancel signals using soft decoded bits and/or symbols (block 461). Again, cancelling of the received signals may be performed by iteratively processing the received signals through the outer loop.

A new iterative filter may then be formed (block 463). According to an example embodiment, the new iterative filter may be formed based on the results of the cancellation of the received signals for user #1 and user #2.

A check may be performed to determine if completion condition(s) is met (block 465). According to an example embodiment, completion condition(s) may include signals from user #1 and user #2 successfully detected, performing a number of iterations, spending a specified amount of time in composite mode detection, spending an amount of resources in composite mode detection, an amount of change in the received signals during a last iteration meeting a threshold, and so on. If the completion condition(s) have been met, operations 450 may then terminate. However, if the completion condition(s) have not been met, processing of the received signals may continue with the receiver returning to block 457 to apply further processing to the received signals from user #1.

Figure 4C:
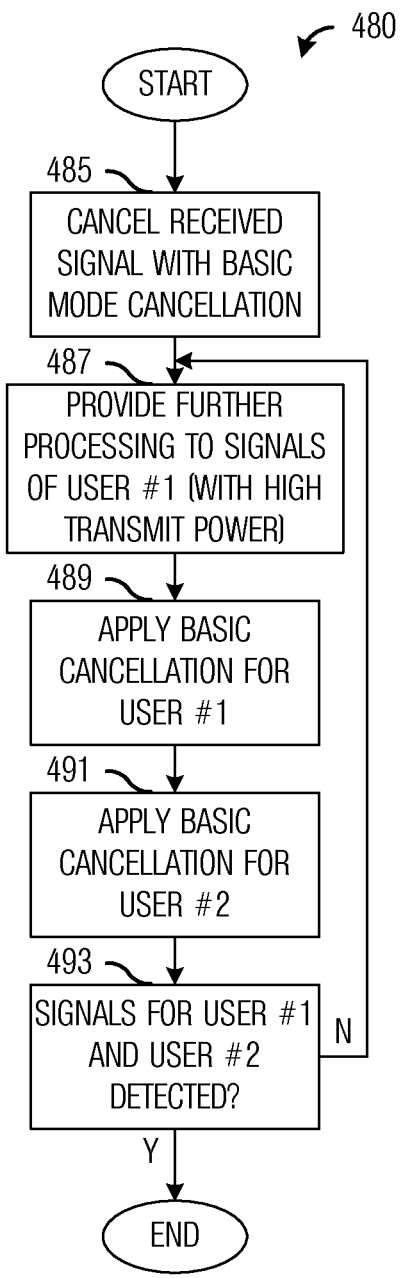
FIG. 4c illustrates an example flow diagram of receiver operations in decoding information in a received signal using composite mode detection according to example embodiments described herein.

FIG. 4c illustrates a flow diagram of detailed receiver operations 480 in decoding information in a received signal using composite mode detection. Receiver operations 480 may be indicative of operations occurring in a receiver, such as receiver 210, as the receiver receives information transmitted by a transmitter over two or more antennas. The receiver makes use of iterative techniques for detecting and decoding information from the received signals and when user, stream, users, and/or streams are transmitting at substantially higher power levels than other user, stream, users, and/or streams. Receiver operations 480 may occur while the receiver is in a normal operating mode.

As discussed previously, composite mode detection may preferably be applied in situations where there exists a user, stream, users, and/or streams that are transmitting at a substantially higher power level than other user, stream, users, and/or streams. However, composite mode detection may be applied in other situations, such as when there are multiple users and/or transmitting at different power levels that are still substantially higher than other user, stream, users, and/or streams, there are users and/or streams transmitting at a variety of different power levels, and so forth.

Furthermore, although the discussion presented herein focuses on two users: user #1 transmitting at power level $P_1$ and user #2 transmitting at power level $P_2$, where $P_1 \gg P_2$, extensions to more than two users may readily be made and are considered to be obvious to those of ordinary skill in the art of the embodiments and will not be discussed in detail herein.

Receiver operations 480 may begin with the receiver applying basic mode detection cancellation (block 485). According to an embodiment, applying basic mode detection cancellation may involve an application of values detected during basic mode detection to eliminate (or reduce) inter-user interference from the received signals in each signal path. For example, a summing point (such as second summing point 336 of FIG. 3a of the first signal path) may be used to eliminate interference from a signal in the second signal path from the first signal path.

As part of composite mode detection, feedback paths of the receiver may be reconfigured (e.g., using switches 355, 356, 357, and 358 of FIG. 3b) so that further processing is provided to signals in the first signal path and the second signal path, with the signals after further processing being fed back in a cross-coupled manner to their respective signal paths (block 487).

Basic mode cancellation may again be applied with signal path values (e.g., weighting factor and/or soft remodulator functions) set to iteratively invert matrix $$(\sigma_1^2 \tilde{H}_1 + \tilde{H}_2 + \sigma_2 I)^{-1}, \qquad (8)$$

where $\tilde{H}_1$ is the channel of user #1, $\tilde{H}_2$ is the channel of user #2, and $\sigma_1^2$ is an estimation error of symbols of user #1 from feedback loop configured for composite mode detection (i.e., feeding back signals after further processing) (block 489).

Basic mode cancellation may also be applied with signal path values (e.g., weighting factor and/or soft remodulator functions) set to iteratively invert matrix $$(\text{diag}(\tilde{H}_1) + \sigma_2^2(\tilde{H}_1 - \text{diag}(\tilde{H}_1)) + \sigma_2^2 \tilde{H}_2 + \sigma^2 I)^{-1}, \qquad (9)$$

where $\sigma_2^2$ is an estimation error of symbols of user #2 from feedback loop configured for composite mode detection (i.e., feeding back signals after further processing) (block 491).

Basic mode cancellation of the received signal using signal path values set to iteratively invert matrices $$(\sigma_1^2 \tilde{H}_1 + \tilde{H}_2 + \sigma^2 I)^{-1}$$

and $$(\text{diag}(\tilde{H}_1) + \sigma_2^2(\tilde{H}_1 - \text{diag}(\tilde{H}_1 - \text{diag}(\tilde{H}_1)) + \sigma_2^2 \tilde{H}_2 \sigma^2 I)^{-1}$$

(blocks 487, 489, and 491) may be repeated with a new iterative filter for $$(\text{diag}(\tilde{H}_2) + \sigma_1^2 \tilde{H}_1 + \sigma_2^2(\tilde{H}_2 - \text{diag}(\tilde{H}_2)) + \sigma^2 I)^{-1} \qquad (10)$$

until a relative received power profile of the information or completion condition(s) are reached (block 493). In other words, blocks 487, 489, and 491 may be repeated until information from user #1 and user #2 are detected or completion condition(s), such as those discussed previously, are met. Receiver operations 480 may then terminate.

Figure 5:
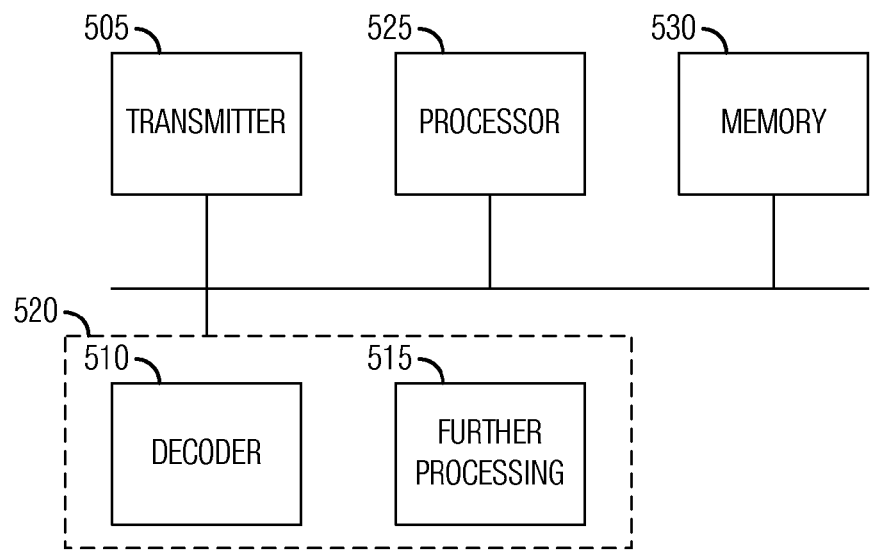
FIG. 5 illustrates an example alternate illustration of a communications device according to example embodiments described herein.

FIG. 5 provides an alternate illustration of a communications device 500. Communications device 500 may be used to implement various ones of the embodiments discussed herein. As shown in FIG. 5, a transmitter 505 is configured to transmit information. A decoder 510 is configured to decode information contained in the received signals using an iterative technique. A further processing unit 515 is configured to provide further processing, such as error control decoding to soft estimates computed in decoder 510. Collectively, decoder 510 and further processing unit 515 may be part of a receiver 520.

A processor 525 is configured to process information decoded from received signals by receiver 520. A memory 530 is configured to store information, as well as values to be used in decoding of information from the received signal by receiver 520.

The elements of communications device 500 may be implemented as specific hardware logic blocks. In an alternative, the elements of communications device 500 may be implemented as software executing in a processing unit such as processor (e.g., microprocessor or digital signal processor), controller, application specific integrated circuit, or so on. In yet another alternative, the elements of communications device 500 may be implemented as a combination of software and/or hardware.

As an example, transmitter 505 may be implemented as a specific hardware block, while receiver 520 (decoder 510 and further processing unit 515) may be software modules executing in a microprocessor or a custom circuit or a custom compiled logic array of a field programmable logic array.

The above described embodiments of communications device 500 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 4a, 4b, and 4c—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for processing information, the method comprising:
operating in a first phase, wherein the first phase comprises iteratively inverting a first filtering operation on received signals;
operating in a second phase, wherein the second phase comprises iteratively inverting a second filtering operation on the received signals with consideration given to a first estimation error of symbols of a first user and a second estimation error of symbols of a second user, the second filtering operation being different from the first filtering operation;
extracting detected information from the first filtered received signals and the second filtered received signals; and
processing the detected information using a processing unit,
wherein iteratively inverting a second filtering operation comprises iteratively inverting $(\sigma_1^2 \tilde{H}_1 + \tilde{H}_2 + \sigma^2 I)^{-1}$, where $\tilde{H}_1$ is a channel from the first user, $\tilde{H}_2$ is a channel from the second user, $\sigma^2$ is an estimation error of symbols, and $\sigma_1^2$ is an estimation error of symbols of the first user.

2. The method of claim 1, wherein processing the detected information comprises decoding the detected information.

3. The method of claim 2, wherein the operating in a first phase and the operating in a second phase is repeated until a completion condition is met.

4. The method of claim 3, wherein the completion condition comprises successfully detecting signals from the first user and the second user, performing a number of iterations, spending a specified amount of time in composite mode detection, spending a specified amount of resources in composite mode detection, an amount of change in the received signals during a last iteration meeting a criteria, or combinations thereof.

5. The method of claim 1, wherein operating in a second phase occurs in response to determining that the first user is transmitting at a substantially higher power level than a second user.

6. The method of claim 1, wherein the first filtering operating comprises a minimum mean squared error filtering operation or a zero forcing filtering operation.

7. The method of claim 1, wherein operating in a first phase comprises:
computing a first soft symbol estimate;
computing a second soft symbol estimate;
combining the second soft symbol estimate with a first received signal, wherein the first received signal corresponds to signals received at a first receive antenna; and
combining the first soft symbol estimate with a second received signal, wherein the second received signal corresponds to signals received at a second receive antenna.

8. The method of claim 1, wherein operating in a second phase comprises:
applying further processing to a first received signal and to a second received signal, thereby producing a further processed first received signal and a further processed second received signal, wherein the first received signal corresponds to signals received at a first receive antenna and the second received signal corresponds to signals received at a second receive antenna;
computing a first soft symbol estimate from the further processed first received signal;
computing a second soft symbol estimate from the further processed second received signal;
combining the second soft symbol estimate with the first received signal; and
combining the first soft symbol estimate with the second received signal.

9. The method of claim 8, wherein the computing a first soft symbol estimate, the computing a second soft symbol estimate, the applying, the combining the second soft symbol estimate, and the combining the first soft symbol estimate are repeated until a criterion is met.

10. The method of claim 9, wherein the criterion comprises a received power profile is met.

11. The method of claim 1, wherein the second filtering operation is formed based on results of a cancellation of the received signals for the first and second user.

12. A method for processing information, the method comprising:
operating in a first phase, wherein the first phase comprises iteratively inverting a first filtering operation on received signals;
operating in a second phase, wherein the second phase comprises iteratively inverting a second filtering operation on the received signals with consideration given to a first estimation error of symbols of a first user and a second estimation error of symbols of a second user, the second filtering operation being different from the first filtering operation;
extracting detected information from the first filtered received signals and the second filtered received signals; and
processing the detected information using a processing unit,
wherein iteratively inverting a second filtering operation comprises iteratively inverting $(\text{diag}(\tilde{H}_1) + \sigma_2^2(\tilde{H}_1 - \text{diag}(\tilde{H}_1)) + \sigma_2^2 \tilde{H}_2 + \sigma^2 I)^{-1}$,
where $\tilde{H}_1$ is a channel from the first user, $\tilde{H}_2$ is a channel from the second user, $\sigma^2$ is an estimation error of symbols, $\sigma_1^2$ is an estimation error of symbols of the first user, and $\sigma_2^2$ is an estimation error of symbols of the second user.

13. A receiver comprising:
an iterative demodulator, the iterative demodulator configured to be coupled to a plurality of signal inputs and to detect information in received signals based on soft estimates of the information, wherein the iterative demodulator comprises:
a first weighing unit configured to apply a first weighting factor to a received signal,
a first soft symbol estimate generator coupled to the first weighing unit, the first soft symbol estimate generator configured to generate a first soft symbol estimate of information in the received signal,
a first remodulator coupled to the first soft symbol estimate generator, the first remodulator configured to apply a modulation to the first soft symbol estimate,
a first summing point having an input coupled to a second remodulator and an output coupled to the first weighing unit, the first summing point configured to combine the received signal and an output produced by the second remodulator,
a second weighing unit having an output coupled to the first summing point, the second weighing unit configured to apply a second weighting factor to the received signal,
a second summing point having an input coupled to the second remodulator, and an output coupled to the second weighing unit, the second summing point configured to combine the received signal and an output produced by the second remodulator;

a further processing unit coupled to the iterative demodulator, the further processing unit configured to provide further processing of soft estimates of the information based on transmit power levels of the information, wherein the further processing unit is coupled to the first weighing unit, and the further processing unit configured to perform error control decoding on an output of the first weighing unit;

a first multiplexer having a first input coupled to an output of the first weighing unit and a second input coupled to an output of the further processing unit, and an output coupled to the first soft symbol estimate generator, the multiplexer configured to selectively couple either the first input or the second input to the output based on the transmit power levels of the information; and a first demultiplexer having an input coupled to an output of the first remodulator, the first demultiplexer configured to selectively couple the input to either a first output coupled to the first summing point or a second output coupled to the second summing point.

14. The receiver of claim 13, wherein the second weighing unit is further configured to extract log likelihood ratio values from the received signal.

15. A method for processing information, the method comprising:

operating in a first phase, wherein the first phase comprises iteratively inverting a first filtering operation on received signals;

operating in a second phase, wherein the second phase comprises iteratively inverting a second filtering operation on the received signals with consideration given to a first estimation error of symbols of a first user and a second estimation error of symbols of a second user, the second filtering operation being different from the first filtering operation;

extracting detected information from the first filtered received signals and the second filtered received signals; and processing the detected information using a processing unit, wherein iteratively inverting a second filtering operation comprises iteratively inverting $(\text{diag}(\tilde{H}_2)+\sigma_1^2\tilde{H}_1+\sigma_2^2(\tilde{H}_2-\text{diag}(\tilde{H}_2))+\sigma^2 I)^{-1}$, where $\tilde{H}_1$ is a channel from the first user, $\tilde{H}_2$ is a channel from the second user, $\sigma^2$ is an estimation error of symbols, $\sigma_1^2$ is an estimation error of symbols of the first user, and $\sigma_2^2$ is an estimation error of symbols of the second user.

* * * * *